US010213943B2

(12) United States Patent
Akasaki et al.

(10) Patent No.: US 10,213,943 B2
(45) Date of Patent: Feb. 26, 2019

(54) COMPOSITION

(71) Applicant: TOYO GOSEI CO., LTD., Ichikawa-shi, Chiba (JP)

(72) Inventors: Taigo Akasaki, Ichikawa (JP); Risa Wada, Ichikawa (JP); Takeshi Osaki, Ichikawa (JP)

(73) Assignee: TOYO GOSEI CO., LTD., Ichikawa-Shi, Chiba (JP)

( * ) Notice: Subject to any disclaimer, the term of this patent is extended or adjusted under 35 U.S.C. 154(b) by 103 days.

(21) Appl. No.: 15/262,730

(22) Filed: Sep. 12, 2016

(65) Prior Publication Data

US 2017/0072601 A1    Mar. 16, 2017

Related U.S. Application Data

(60) Provisional application No. 62/217,621, filed on Sep. 11, 2015.

(51) Int. Cl.
| | | |
|---|---|---|
| *B29C 41/24* | (2006.01) | |
| *B29C 41/44* | (2006.01) | |
| *B29C 35/08* | (2006.01) | |
| *C08J 5/18* | (2006.01) | |
| *C08G 18/62* | (2006.01) | |
| *C08G 18/81* | (2006.01) | |
| *C08F 290/06* | (2006.01) | |
| *B29L 7/00* | (2006.01) | |

(52) U.S. Cl.
CPC .......... *B29C 41/24* (2013.01); *B29C 35/0805* (2013.01); *B29C 41/44* (2013.01); *C08F 290/067* (2013.01); *C08G 18/6279* (2013.01); *C08G 18/8116* (2013.01); *C08J 5/18* (2013.01); *B29C 2035/0827* (2013.01); *B29K 2995/007* (2013.01); *B29L 2007/008* (2013.01); *C08J 2335/02* (2013.01); *C08J 2375/16* (2013.01)

(58) Field of Classification Search
CPC ..................................................... B29C 41/24
USPC ....................................................... 264/496
See application file for complete search history.

(56) References Cited

U.S. PATENT DOCUMENTS

| | | | | |
|---|---|---|---|---|
| 6,363,603 | B1* | 4/2002 | Nemoto | B29C 43/021 29/458 |
| 7,230,140 | B2* | 6/2007 | Shirakawa | C08G 65/007 568/615 |
| 9,240,565 | B2 | 1/2016 | Osaki et al. | |
| 9,366,782 | B2 | 6/2016 | Osaki et al. | |
| 9,840,038 | B2* | 12/2017 | Wada | G03F 7/0002 |
| 2003/0227688 | A1* | 12/2003 | Houlihan | G02B 3/0031 359/619 |
| 2009/0028910 | A1* | 1/2009 | DeSimone | A61K 9/0097 424/401 |
| 2009/0292049 | A1* | 11/2009 | Tomiyama | C08G 18/10 524/323 |
| 2012/0164387 | A1* | 6/2012 | Watanabe | B29C 33/40 428/156 |
| 2013/0258467 | A1* | 10/2013 | Shiraiwa | C09D 5/006 359/483.01 |
| 2014/0306375 | A1 | 10/2014 | Wada et al. | |
| 2014/0309393 | A1 | 10/2014 | Osaki et al. | |
| 2014/0335304 | A1 | 11/2014 | Osaki | |
| 2014/0361275 | A1 | 12/2014 | Osaki et al. | |
| 2015/0274871 | A1 | 10/2015 | Osaki et al. | |
| 2015/0368453 | A1 | 12/2015 | Wada et al. | |
| 2016/0017074 | A1 | 1/2016 | Wada et al. | |
| 2016/0208127 | A1 | 7/2016 | Wada et al. | |
| 2017/0240839 | A1* | 8/2017 | Maccone | C10M 147/04 |

FOREIGN PATENT DOCUMENTS

JP    2014076557 A    5/2014

OTHER PUBLICATIONS

U.S. Appl. No. 15/109,602, filed Jul. 1, 2016 with the U.S. Patent Office.

* cited by examiner

*Primary Examiner* — Matthew J Daniels
*Assistant Examiner* — Hana C Page
(74) *Attorney, Agent, or Firm* — TraskBritt, P.C.

(57) ABSTRACT

A suitable combination of a composition for formation of a resin mold with a pattern and a composition for formation of resin to which the pattern is transferred from the resin mold is found.

3 Claims, No Drawings

COMPOSITION

CROSS-REFERENCE TO RELATED APPLICATION

This application claims the benefit under 35 U.S.C. § 119(e) of U.S. Provisional Patent Application Ser. 62/217,621 filed on Sep. 11, 2015, the disclosure of which is hereby incorporated herein in its entirety by these references.

TECHNICAL FIELD

Several aspects of this patent application relate to the fields of chemical compositions and associated manufacturing components and methods, particularly as they relate to nanoimprinting technologies.

BACKGROUND

Improving releasability of a film formed by curing a composition from a resin mold is an important technical problem for nanoimprinting technologies. One way to improve releasability is disclosed in JP 2014-076557 (laid-open disclosure date: May 1, 2014), the contents of which are incorporated herein by this reference.

BRIEF SUMMARY

When a film with a pattern is manufactured by transferring the pattern preliminarily formed in a resin mold to the film, damage in the resin mold or the film to which the pattern is transferred from the resin mold often occurs. In particular, such a tendency becomes prominent for larger patterns.

Disclosed herein are, among other things, combinations of a composition for formation of a resin mold with a pattern and a composition for formation of a film to which the pattern is transferred from the resin mold, which improve releasability of the film from the resin mold.

A method of manufacturing a component relating to an aspect of the disclosure includes:
  providing a first composition;
  providing a resin mold with a pattern;
  curing the first composition to form a film to which the pattern is transferred from the resin mold; and
  separating the film from the resin mold.

Examples of such components are lens, waveguides, and diffusers.

With regard to the method, it is preferred that the Shore hardness of the resin mold ranges from 1 to 50 when the Shore hardness of the film formed from the first composition ranges from 1 to 100.

With regard to the method, it is preferred that a size of the pattern is greater than or equal to 50 µm, 100 µm, 200 µm or 600 µm. "Size of the pattern" means typically the width of recess portions constituting the pattern. The shore hardness becomes important for releasability of a hardened body from a resin mold that transfers a pattern to the hardened body as the pattern size becomes larger With regard to the method, it is preferred that the Shore hardness of the resin mold ranges from 51 to 60 when the Shore hardness of the film formed from the first composition ranges from 1 to 60.

If the size of pattern formed on the surface of a resin mold formed by curing a composition is 600 it is preferred that the Shore hardness of the film formed from the first composition range from 1 to 50 when the Shore hardness of the resin mold ranges from 51 to 60.

With regard to the method, when the Shore hardness of a resin mold formed by curing a composition for formation of the resin mold ranges from 1 to 50, it is preferred that the Shore hardness of a resin that is formed from another composition and is to be separated from the resin mold ranges from 1 to 100.

With regard to the method, when the Shore hardness of a resin mold formed by curing a composition for formation of the resin mold ranges from 51 to 60, it is preferred that the Shore hardness of a resin that is formed from another composition and is be separated from the resin mold ranges from 1 to 50.

With regard to the method, if the Shore hardness of a resin mold formed by curing a composition for formation of the resin mold ranges from 76 to 100, it is preferred that the Shore hardness of a resin that is formed from another composition and is to be separated from the resin mold ranges from 1 to 40.

With regard to the method, if the Shore hardness of a resin mold formed by curing a composition for formation of the resin mold ranges from 61 to 75, it is preferred that the Shore hardness of a resin that is formed from another composition and is to be separated from the resin mold ranges from 1 to 45.

If the size of pattern formed on the surface a resin mold formed by curing a composition for the resin mold is 200 µm, it is preferred that it is preferred that, when the Shore hardness of a resin mold formed by curing a composition for formation of the resin mold ranges from 1 to 50, the Shore hardness of a resin that is formed from another composition and is to be separated from the resin mold ranges from 1 to 100.

If the size of pattern formed on the surface a resin mold formed by curing a composition for the resin mold is 200 µm, it is preferred that it is preferred that, when the Shore hardness of a resin mold formed by curing a composition for formation of the resin mold ranges from 51 to 60, the Shore hardness of a resin that is formed from another composition and is to be separated from the resin mold ranges from 1 to 60.

If the size of pattern formed on the surface a resin mold formed by curing a composition for the resin mold is 200 µm, it is preferred that it is preferred that, when the Shore hardness of a resin mold formed by curing a composition for formation of the resin mold ranges from 61 to 75, the Shore hardness of a resin that is formed from another composition and is to be separated from the resin mold ranges from 1 to 55.

If the size of pattern formed on the surface a resin mold formed by curing a composition for the resin mold is 200 µm, it is preferred that it is preferred that, when the Shore hardness of a resin mold formed by curing a composition for formation of the resin mold ranges from 76 to 100, the Shore hardness of a resin that is formed from another composition and is to be separated from the resin mold ranges from 1 to 45.

If the size of pattern formed on the surface a resin mold formed by curing a composition for the resin mold is 600 µm, it is preferred that it is preferred that, when the Shore hardness of a resin mold formed by curing a composition for formation of the resin mold ranges from 1 to 50, the Shore hardness of a resin that is formed from another composition and is to be separated from the resin mold ranges from 1 to 100.

If the size of pattern formed on the surface a resin mold formed by curing a composition for the resin mold is 600 μm, it is preferred that it is preferred that, when the Shore hardness of a resin mold formed by a composition for formation of the resin mold ranges from 51 to 60, the Shore hardness of a resin that is formed from another composition and is to be separated from the resin mold ranges from 1 to 50.

If the size of pattern formed on the surface a resin mold formed by curing a composition for the resin mold is 600 μm, it is preferred that it is preferred that, when the Shore hardness of a resin mold formed by a composition for formation of the resin mold ranges from 61 to 75, the Shore hardness of a resin that is formed from another composition and is to be separated from the resin mold ranges from 1 to 45.

If the size of pattern formed on the surface a resin mold formed by a composition for the resin mold is 600 μm, it is preferred that it is preferred that, when the Shore hardness of a resin mold formed by a composition for formation of the resin mold ranges from 76 to 100, the Shore hardness of a resin that is formed from another composition and is to be separated from the resin mold ranges from 1 to 40.

It is preferred that the reaction percentage of a resin mold estimated on the basis of the ratio of amounts of unreacted monomers remaining in the resin mold to those of monomers contained in a composition ("mold composition") for formation of the resin mold before curing the mold composition is greater than or equal to 50% to ensure enough releasability of a film formed by hardening on the resin mold from the resin mold. If a resin mold of which the reaction percentage is less than 50% is used, unreacted monomers remaining in the resin mold reacts easily with monomers contained in a composition ("film composition"), which is to be a film by a light irradiation of the film composition when the film composition is cured by a light irradiation of the film composition in a state in which the film composition is placed on the resin mold and contacts the resin mold. Thus, the releasability of the film from the resin mold decreases or damage easily arises when the film formed from the film composition is separated from the resin mold.

It is preferred that the reaction percentage of a film formed from a film composition estimated on the basis of the ratio of amounts of unreacted monomers remaining in the film to those of monomers contained in the film composition before curing of the film composition is greater than or equal to 50% to ensure enough releasability of the film from a resin mold. If the reaction percentage for the film is less than 50%, the film does not typically have enough mechanical strength.

Thus, damages or defects easily arise in the film when the film formed from the film composition is separated from the resin mold.

If the Shore hardness of a resin mold formed by curing a mold composition for formation of the resin mold ranges from 1 to 50, it is preferred that the Shore hardness of a patterned resin that is formed by hardening or curing a film composition by in a state in which the film composition is placed on the resin mold and contacts the resin mold ranges from 1 to 100.

If the Shore hardness of a resin mold formed by curing a composition for formation of the resin mold ranges from 51 to 60, it is preferred that the Shore hardness of a patterned resin that is formed by hardening or curing a film composition by in a state in which the film composition is placed on the resin mold and contacts the resin mold ranges from 1 to 50.

If the Shore hardness of a resin mold formed by a curing composition for formation of the resin mold ranges from 61 to 75, it is preferred that the Shore hardness of a patterned resin that is formed by hardening or curing a film composition by in a state in which the film composition is placed on the resin mold and contacts the resin mold ranges from 1 to45.

If the Shore hardness of a resin mold formed by curing a composition for formation of the resin mold ranges from 76 to 100, it is preferred that the Shore hardness of a patterned resin that is formed by hardening or curing a film composition by in a state in which the film composition is placed on the resin mold and contacts the resin mold ranges from 1 to 40.

Composition for Formation of Resin Mold

It is preferred that a composition for formation of a resin mold contains at least one of a compound (Compound A) expressed by the chemical formula (1) and a compound (Compound B) expressed by the chemical formula (II). Both Compounds A and B have fluorine atoms and at least one polymerizable group. Fluorine atoms can improve releasability of a film that is formed by curing a film composition in a state in which the film composition contacts a patterned surface of the resin mold from the resin mold. It is more preferable that both Compounds A and B have at least two polymerizable groups to accelerate polymerization.

Compound A

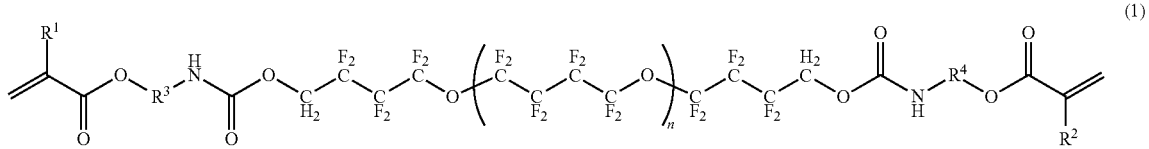

(1)

In the above chemical formula, each of $R^1$, $R^2$ and $R^3$ and $R^4$ represents a substituent including at least one of the group consisting of hydrogen atom, carbon atom, nitrogen atom, and sulfur atom. "n" denotes integer from 1 to 10.

It is preferred that each of $R^1$ and $R^2$ is hydrogen atom or methyl group with regard to Compound A.

Compound B

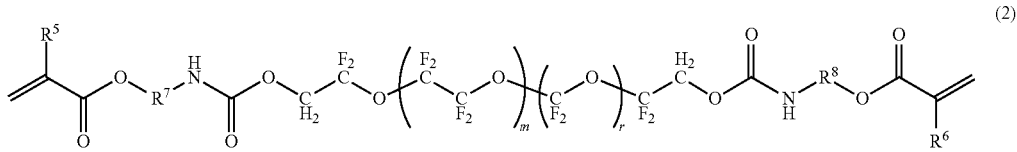
(2)

In the above chemical formula, each of $R^5$, $R^6$, $R^7$ and $R^8$ represents a substituent including at least one of the group consisting of hydrogen atom, carbon atom, nitrogen atom and sulphur atom. Each of "m" and "r" denotes integer from 1 to 30.

It is preferred that each of $R^5$ and $R^6$ is hydrogen atom or methyl group with regard to Compound B.

In any one of the above compositions, it is preferred that each of $R^1$ and $R^2$ represents any one of hydrogen atom and methyl group.

In any one of the above compositions, it is preferred that each of $R^5$ and $R^6$ represents any one of hydrogen atom and methyl group.

It is preferred that the compound represented by the chemical formula 1 has at least one of moieties represented by formulae 3 and 4. Each of the moieties may have any one of chemical structures represented by the chemical formulae 5, 6 and 7.

It is preferred that, if the $R^9$ is a substituent represented by the chemical formula 8, is any one of hydrogen atom and methyl group and each of the $R^{10}$ and $R^{12}$ is a hydrogen atom.

It is preferred that, if $R^{10}$ is a substituent represented by the chemical formula 8, $R^{12}$ is one of hydrogen atom and the methyl group and each of the $R^9$ and is a hydrogen atom.

It is preferred that, if is a substituent represented by the chemical formula 8, $R^9$ is one of hydrogen atom and methyl group and each of the $R^{10}$ and $R^{12}$ is a hydrogen atom.

It is preferred that, if the $R^{12}$ is a substituent is represented by the chemical formula 8, $R^{10}$ is one of hydrogen atom and methyl group and each of $R^9$ and may be a hydrogen atom.

Alternatively, each of $R^9$, $R^{10}$, $R^{11}$ and $R^{12}$ may be a hydrogen atom.

It is preferred that the compound represented by the chemical formula 2 has at least one of moieties represented by formulae 9 and 10. Each of the moieties may have any one of chemical structures represented by formulae 11, 12 and 13.

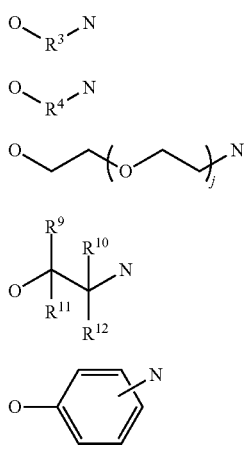

(3)
(4)
(5)
(6)
(7)

(9)
(10)
(11)
(12)
(13)

"j" of the chemical structure represented by the chemical formula 5 denotes 1 or 2. Each of $R^9$, $R^{10}$, $R^{11}$ and $R^{12}$ of the chemical formula 6 represents any one of hydrogen atom and methyl group and a moiety represented by the chemical formula 8.

(8)

In the above chemical formula, $R^{13}$ denotes hydrogen atom or methyl group.

"k" of the chemical formula 11 is 1 or 2. Each of $R^{14}$, $R^{15}$, $R^{16}$ and $R^{17}$ is any one of hydrogen atom, methyl group and a moiety represented by the chemical formula 14.

(14)

$R^{18}$ of the chemical formula 14 denotes hydrogen atom or methyl group.

It is preferred that, if $R^{14}$ includes the moiety represented by the chemical formula 14, $R^{16}$ is hydrogen atom or methyl group and each of $R^{15}$ and $R^{17}$ is a hydrogen atom.

It is preferred that, if $R^{15}$ includes the moiety represented by the chemical formula 14, $R^{17}$ is one of hydrogen atom and methyl group and each of $R^{14}$ and $R^{16}$ is a hydrogen atom.

It is preferred that, if $R^{16}$ includes the moiety represented by the chemical formula 14, $R^{14}$ is one of hydrogen atoms methyl group and each of the $R^{15}$ and $R^{17}$ is a hydrogen atom.

It is preferred that, if $R^{17}$ includes the moiety represented by the chemical formula 14, $R^{15}$ is one of hydrogen atoms methyl group and each of the $R^{14}$ and $R^{16}$ is a hydrogen atom.

Alternatively, each of $R^{14}$, $R^{15}$, $R^{16}$ and $R^{17}$ may be a hydrogen atom.

The content amount of Compound A in the composition for formation of resin mold may range from 0 wt % to 99.9 wt %.

It is preferred that the content amount of Compound A in the composition for formation of resin mold ranges from 10 wt % to 99.9 wt %.

It is more preferred that the content amount of Compound A in the composition for formation of resin mold ranges from 35 wt % to 99.9 wt %.

The content amount of Compound B in the composition for formation of resin mold may range from 0 wt % to 80 wt %.

It is preferred that the content amount of Compound B in the composition for formation of resin mold ranges from 0 wt % to 65 wt %.

Such composition for formation of resin mold may further contain a monomer having only one polymerizable group such as acryloyl group and methacryloyl group.

The molecular weight of such monomer may range from 80 to 600.

It is preferred that the molecular weight of such monomer ranges from 86 to 450 due to greater solubility in the composition.

The content amount of such monomer may range from 0 wt % to 70 wt %. It is preferred that the content amount of such monomer ranges from 0 wt % to 50 wt %.

Such monomer may contain at least one fluorine atom due to improvement of mold releasability.

Such composition for formation of resin mold may further contain a monomer having plural polymerizable groups such as acryloyl group and methacryloyl group.

The molecular weight of such monomer may range from 170 to 500.

It is preferred that the molecular weight of such monomer ranges from 170 to 400 due to greater solubility in the composition.

The content amount of such monomer may range from 0 wt % to 50 wt %. It is preferred that the content amount of such monomer ranges from 0 wt % to 40 wt %.

It is preferred that such composition for formation of resin mold further contain a photoinitiator.

The content amount of such photoinitiator may range from 0.005 wt % to 20 wt %. It is preferred that the content amount of such monomer ranges from 0.01 wt % to 15 wt %.

Such composition for formation of resin mold may further contain antioxidant, light stabilizer, surfactant, UV absorber, sensitizer, colorant, filler, polymer and solvent.

Composition for Formation of a Patterned Resin of which Shore Hardness Ranges from 1 to 50

The patterned resin is formed by an irradiation of a composition with a light in a state in which the composition contacts a patterned surface of the resin mold. Further, the patterned resin is separated from the resin mold.

It is preferred that such composition for formation of a patterned resin contains at least one kind of monomers. Such monomer is at least one of the following monomers:
  (i) urethane acrylate or urethane methacrylate with plural polymerizable groups of which molecular weight ranges from 400 to 35000;
  (ii) acrylate or methacrylate with a main chain including ether group of which molecular weight ranges from 300 to 4000; and
  (iii) acrylate or methacrylate with a main chain including ester group of which molecular weight ranges from 500 to 3000.

The content amount of such monomers may be range from 20 wt % to 99.9 wt %. It is preferred that the content amount of such monomers range from 30 wt % to 99.9 wt %.

Such urethane acrylate or urethane methacrylate may be a polyol compound. Such urethane acrylate or urethane methacrylate may have a polyester framework, polycarbonate framework or alkyl carbonate.

Typical examples of Such urethane acrylate or urethane methacrylate are UN-333, UN-350, UN-1255, UN-2600, UN-2700, UN-5590, UN-6200, UN-6202, UN-6300, UN-6301, UN-7600, UN-7700, UN-9000PEP, UN-9200A (Negami Chemical Industrial Co., Ltd.), U-200PA, UA-160TM, UA-290TM, UA-4200, UA-4400 (SHIN-NA-KAMURA CHEMICAL Co., Ltd.), UX-3204, UX-4101, UX-7101, UX-0937, UXF-4001-M35, UXF-4002 (Nippon Kayaku Co., Ltd), UV-2000B, UV-2750B, UV-3000B, UV-3200B, UV-3300B, UV-3310B, UV-3700B and UV-6640B (The Nippon Synthetic Chemical Industry Co., Ltd.).

Typical examples of (ii) acrylate or methacrylate with a main chain including ether group are A-200, A-400, A-600, A-1000, APG-100, APG-200, APG-400, APG-700, A-PTMG-65, A-1206PE, A-0612PE, A-0412PE, A-1000PER, A-3000PER, A-TMPT-3EO, A-TMPT-9EO, AT-20E, AT-30E, A-TMPT-3PO, A-TMPT-6PO, A-GLY-3E, A-GLY-6E, A-GLY-9E, A-GLY-20E, A-GLY-3 P, A-GLY-6 P, A-GLY-9 P, ATM-4EL, ATM-8EL, ATM-4PL, ATM-4E, ATM-35E, ATM-4 P, ATM-10 P, AD-TMP-4E, AD-TMP-4 P, A-DPH-6E, A-DPH-12E, A-DPH-6EL, A-DPH-12EL, A-DPH-6 P, A-PG5027E, A-PG5054E, 4G, 9G, 14G, 3PG, 9PG, 1206PE, 1000PER, TMPT-3EO, TMPT-9EO, TMPT-3PO, GLY-3E, GLY-6E, GLY-9E, GLY-20E, TM-4EL, TM-4PL, TM-4E, TM-35E, TM-4 P, TM-10 P, D-TMP-4E, D-TMP-4 P, M-DPH-6E, M-DPH-12E, M-DPH-6 P, M-PG5027E and M-PG5054E(SHIN-NAKAMURA CHEMICAL Co., Ltd.).

Typical examples of (iii) acrylate or methacrylate with a main chain including ester group are KAYARAD HX-220, KAYARADHX-620, KAYARAD DPCA-20, KAYARAD-DPCA-30, KAYARAD DPCA-60 and KAYARADDPCA-120(Nippon Kayaku Co., Ltd).

Such composition for formation of resin to be separated from resin may further contain an acrylate or methacrylate having only one polymerizable group. It is preferred that such an acrylate or methacrylate has an ether group due to its higher flexibility. It is preferred that the molecular weight of such an acrylate or methacrylate with the ether group ranges from 130 to 700. Alternatively, an acrylate or methacrylate having only one polymerizable group contained in such composition may have alkyl group. Molecular weight of such acrylate or methacrylate may range from 86 to 400.

Typical examples of such an acrylate or methacrylate with the ether group are AM-30G, AM-90G, AM-130G, AM30PG, M-20G, M-30G, M-40G, M-90G, M-130G, M-30PG and EH-4E, B-20G(SHIN-NAKAMURA CHEMICAL Co., Ltd.).

Typical examples of such acrylate or methacrylate with the alkyl group are methyl(meth) acrylate, ethyl(meth) acrylate, n-buthyl(meth) acrylate, isobuthyl(meth) acrylate, t-butyl(meth) acrylate, 2-ethyl hexyl(meth) acrylate, isodecyl (meth) acrylate, n-lauryl(meth) acrylate, isoamylacrylate, isotetradecyl(meth) acrylate, n-stearyl(meth) acrylate, bihenyl(meth) acrylate are isostearyl(meth) acrylate.

It is preferred that the content amount of such acrylate or methacrylate with the ether group or alkyl group ranges from 0 wt % to 79.9 wt %. It is more preferred that the content amount of such acrylate or methacrylate with the ether group or alkyl group ranges from 0 wt % to 69.9 wt %.

It is preferred that such composition for formation of the patterned resin to which the pattern is transferred from the resin mold further contains photoinitiator. The content amount of such photoinitiator may be from 0.005 wt % to 20 wt %. It is preferred that the content amount of such photoinitiator ranges from 0.01 wt % to 15 wt %.

Such composition may further contain antioxidant, light stabilizer, surfactant, UV absorber, sensitizer, colorant, filler, polymer or solvent.

Composition for Formation of a Patterned Resin of which Shore Hardness Ranges from 51 to 100

The patterned resin is formed by an irradiation of a composition with a light in a state in which the composition contacts a patterned surface of the resin mold. Further, the patterned resin is separated from the resin mold.

It is preferred that such composition contains at least one of acrylate or methacrylate having plural polymerizable groups and alicyclic group and urethane acrylate or urethane methacrylate having plural polymerizable groups and alicyclic group.

Such composition may further contain at least one of (a) acrylate or methacrylate with only one polymerizable group, (b) acrylate or methacrylate having plural polymerizable groups and no alicyclic group of which molecular weight is from 170 to 700 and (c) urethane acrylate or urethane methacrylate having plural polymerizable groups and no alicyclic group of which molecular weight is from 400 to 25000.

It is preferred that such a composition for formation of resin to be separated from resin further contains photoinitiator. The content amount of such photoinitiator may be from 0.005 wt % to 20 wt %. It is preferred that the content amount of such photoinitiator ranges from 0.01 wt % to 6 wt %.

Such composition may further contain antioxidant, light stabilizer, surfactant, UV absorber, sensitizer, colorant, filler, polymer or solvent.

DETAILED DESCRIPTION

Experimental Procedures:

Table 1 shows compositions for the formation of resin mold(s) with a pattern with size of 200 μm and for formation of resin to which the pattern is transferred from resin mold and shore hardness. Table 2 shows compositions for formation of resin mold with a pattern with size of 600 μm and for formation of resin to which the pattern is transferred from resin mold and shore hardness. The phrase "a pattern with size of 200 μm" typically means that, when a pattern formed by the recess and convex portions, each of the recess portions has a width of 200 μm while the phrase "a pattern with size of 600 μm" typically means each of recess portions has a width of 600 μm.

Compositions for formation of a resin mold contains constituents A to E while compositions of formation of a resin ("pattern-transferred resin") to which the pattern of the resin mold is transferred from the resin mold contains F to M and E.

Constituents A to M are following compounds.

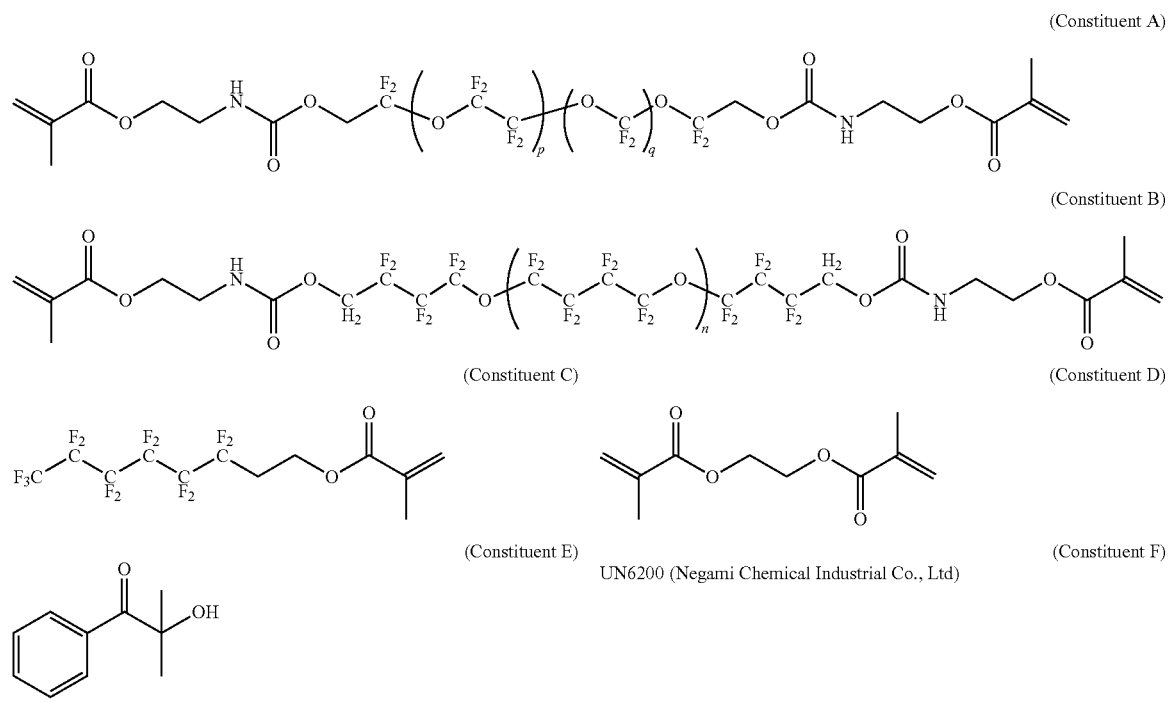

-continued (Constituent G) 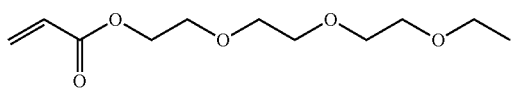 (Constituent H) 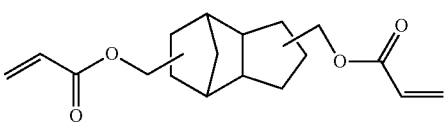

(Constituent I) 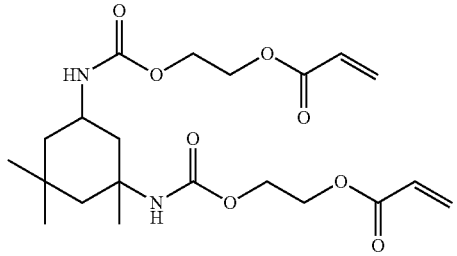

(Constituent J) UN2600 (Negami Chemical Industrial Co., Ltd)

(Constituent K) 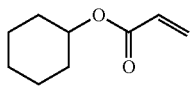 (Constituent L) 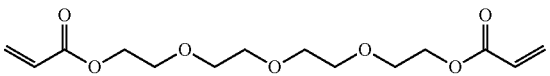

(Constituent M) 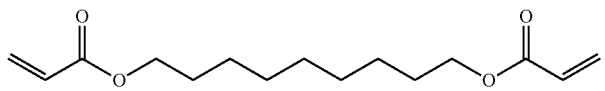

TABLE 1

Compositions for formation of resin mold having a pattern with size of 200 μm and for formation of resin ("pattern-transferred resin") to which the pattern is transferred from resin mold and Shore hardness.

|  |  | Entry 1 | Entry 2 | Entry 3 | Entry 4 | Entry 5 | Entry 6 | Entry 7 | Entry 8 | Entry 9 | Entry 10 |
|---|---|---|---|---|---|---|---|---|---|---|---|
| Composition for formation of resin mold with a pattern | Constituent A | 99.5% | 99.5% | 99.5% | 49.75% | 49.75% | 49.75% | 20.7% | 20.7% | 20.7% | 20.7% |
|  | Constituent B |  |  |  | 49.75% | 49.75% | 49.75% | 78.8% | 78.8% | 78.8% | 78.8% |
|  | Constituent C |  |  |  |  |  |  |  |  |  |  |
|  | Constituent D |  |  |  |  |  |  |  |  |  |  |
|  | Constituent E | 0.5% | 0.5% | 0.5% | 0.5% | 0.5% | 0.5% | 0.5% | 0.5% | 0.5% | 0.5% |
| Composition for formation of pattern-transferred resin | Constituent F | 62.0% |  |  | 62.0% |  |  | 62.0% |  |  |  |
|  | Constituent G | 37.8% |  |  | 37.8% |  |  | 37.8% |  |  |  |
|  | Constituent H |  | 49.9% |  |  | 49.9% | 37.8% |  |  |  | 37.8% |
|  | Constituent I |  | 49.9% |  |  | 49.9% |  |  |  |  |  |
|  | Constituent J |  |  | 62.0% |  |  | 62.0% |  | 99.8% | 89.8% | 62.0% |
|  | Constituent K |  |  |  |  |  |  |  |  | 10.0% |  |
|  | Constituent L |  |  |  |  |  |  |  |  |  |  |
|  | Constituent M |  |  |  |  |  |  |  |  |  |  |
|  | Constituent E | 0.2% | 0.2% | 0.2% | 0.2% | 0.2% | 0.2% | 0.2% | 0.2% | 0.2% | 0.2% |
| Shore hardness of resin mold with a pattern |  | 28 | 28 | 28 | 48 | 48 | 48 | 58 | 58 | 58 | 58 |
| Shore hardness of pattern-transferred resin |  | 11 | 78 | 70 | 11 | 78 | 70 | 11 | 48 | 56 | 70 |
| Pattern size |  | 200 μm | 200 μm | 200 μm | 200 μm | 200 μm | 200 μm | 200 μm | 200 μm | 200 μm | 200 μm |
| Presence of damage of resin mold or pattern-transferred resin |  | A | A | A | A | A | A | A | A | A | P |

|  |  | Entry 11 | Entry 12 | Entry 13 | Entry 14 | Entry 15 | Entry 16 | Entry 17 | Entry 18 | Entry 19 |
|---|---|---|---|---|---|---|---|---|---|---|
| Composition for formation of resin mold with a pattern | Constituent A |  |  |  |  |  |  |  |  |  |
|  | Constituent B | 99.5% | 87.1% | 99.5% | 99.5% | 99.5% | 68.4% | 68.4% | 68.4% | 68.4% |
|  | Constituent C |  | 12.4% |  |  |  |  |  |  |  |
|  | Constituent D |  |  |  |  |  | 31.1% | 31.1% | 31.1% | 31.1% |
|  | Constituent E | 0.5% | 0.5% | 0.5% | 0.5% | 0.5% | 0.5% | 0.5% | 0.5% | 0.5% |
| Composition for formation of pattern-transferred resin | Constituent F | 62.0% | 62.0% | 62% |  |  | 62.0% | 62.0% | 62.0% |  |
|  | Constituent G | 37.8% | 37.8% |  |  |  | 37.8% |  |  |  |
|  | Constituent H |  |  |  |  |  |  |  |  |  |
|  | Constituent I |  |  |  |  |  |  |  |  |  |
|  | Constituent J |  |  |  | 98.8% | 89.8% |  |  |  | 98.8% |

TABLE 1-continued

Compositions for formation of resin mold having a pattern with size of 200 μm and for formation of resin ("pattern-transferred resin") to which the pattern is transferred from resin mold and Shore hardness.

|  |  |  |  |  |  |  |  |  |  |
|---|---|---|---|---|---|---|---|---|---|
| Constituent K |  |  |  |  | 10.0% |  |  |  |  |
| Constituent L |  |  |  |  |  |  | 37.8% |  |  |
| Constituent M |  |  | 37.8% |  |  |  |  | 37.8% |  |
| Constituent E | 0.2% | 0.2% | 0.2% | 0.2% | 0.2% | 0.2% | 0.2% | 0.2% | 0.2% |
| Shore hardness of resin mold with a pattern | 65 | 69 | 65 | 65 | 65 | 78 | 78 | 78 | 78 |
| Shore hardness of pattern-transferred resin | 11 | 11 | 41 | 48 | 56 | 11 | 35 | 41 | 48 |
| Pattern size | 200 μm | 200 μm | 200 μm | 200 μm | 200 μm | 200 μm | 200 μm | 200 μm | 200 μm |
| Presence of damage of resin mold or pattern-transferred resin | A | A | A | A | P | A | A | A | P |

TABLE 2

Compositions for formation of resin mold having a pattern with size of 600 μm and for formation resin ("pattern-transferred resin") to which the pattern is transferred and Shore hardness

|  |  | Entry 20 | Entry 21 | Entry 22 | Entry 23 | Entry 24 | Entry 25 | Entry 26 | Entry 27 |
|---|---|---|---|---|---|---|---|---|---|
| Composition for formation of resin mold with a pattern | Constituent A | 99.5% | 99.5% | 99.5% | 49.75% | 49.75% | 49.75% | 20.7% | 20.7% |
|  | Constituent B |  |  |  | 49.75% | 49.75% | 49.75% | 78.8% | 78.8% |
|  | Constituent C |  |  |  |  |  |  |  |  |
|  | Constituent D |  |  |  |  |  |  |  |  |
|  | Constituent E | 0.5% | 0.5% | 0.5% | 0.5% | 0.5% | 0.5% | 0.5% | 0.5% |
| Composition for formation of pattern-transferred resin | Constituent F | 62.0% |  |  | 62.0% |  |  | 62.0% |  |
|  | Constituent G | 37.8% |  |  | 37.8% |  |  | 37.8% |  |
|  | Constituent H |  | 49.9% | 37.8% |  | 49.9% | 37.8% |  |  |
|  | Constituent I |  | 49.9% |  |  | 49.9% |  |  |  |
|  | Constituent J |  |  | 62.0% |  |  | 62.0% |  | 99.8% |
|  | Constituent K |  |  |  |  |  |  |  |  |
|  | Constituent L |  |  |  |  |  |  |  |  |
|  | Constituent M |  |  |  |  |  |  |  |  |
|  | Constituent E | 0.2% | 0.2% | 0.2% | 0.2% | 0.2% | 0.2% | 0.2% | 0.2% |
| Shore hardness of resin mold with a pattern |  | 28 | 28 | 28 | 48 | 48 | 48 | 58 | 58 |
| Shore hardness of pattern-transferred resin |  | 11 | 78 | 70 | 11 | 78 | 70 | 11 | 48 |
| Pattern size |  | 600 μm | 600 μm | 600 μm | 600 μm | 600 μm | 600 μm | 600 μm | 600 μm |
| Presence of damage of resin mold or pattern-transferred resin |  | A | A | A | A | A | A | A | A |

|  |  | Entry 28 | Entry 29 | Entry 30 | Entry 31 | Entry 32 | Entry 33 | Entry 34 | Entry 35 |
|---|---|---|---|---|---|---|---|---|---|
| Composition for formation of resin mold with a pattern | Constituent A | 20.7% |  |  |  |  |  |  |  |
|  | Constituent B | 78.8% | 99.5% | 87.1% | 99.5% | 99.5% | 68.4% | 68.4% | 68.4% |
|  | Constituent C |  |  | 12.4% |  |  |  |  |  |
|  | Constituent D |  |  |  |  |  | 31.1% | 31.1% | 31.1% |
|  | Constituent E | 0.5% | 0.5% | 0.5% | 0.5% | 0.5% | 0.5% | 0.5% | 0.5% |
| Composition for formation of pattern-transferred resin | Constituent F |  | 62.0% | 62.0% | 62% |  | 62.0% | 62.0% | 62.0% |
|  | Constituent G |  | 37.8% | 37.8% |  |  | 37.8% |  |  |
|  | Constituent H |  |  |  |  |  |  |  |  |
|  | Constituent I |  |  |  |  |  |  |  |  |
|  | Constituent J | 89.8% |  |  |  | 98.8% |  |  |  |
|  | Constituent K | 10.0% |  |  |  |  |  |  |  |
|  | Constituent L |  |  |  |  |  |  | 37.8% |  |
|  | Constituent M |  |  |  | 37.8% |  |  |  | 37.8% |
|  | Constituent E | 0.2% | 0.2% | 0.2% | 0.2% | 0.2% | 0.2% | 0.2% | 0.2% |
| Shore hardness of resin mold with a pattern |  | 58 | 65 | 69 | 65 | 65 | 78 | 78 | 78 |
| Shore hardness of pattern-transferred resin |  | 56 | 11 | 11 | 41 | 48 | 11 | 35 | 41 |
| Pattern size |  | 600 μm | 600 μm | 600 μm | 600 μm | 600 μm | 600 μm | 600 μm | 600 μm |
| Presence of damage of resin mold or pattern-transferred resin |  | P | A | A | A | P | A | A | P |

If damage or a deficit is found for resin mold or pattern-transferred resin when pattern-transferred resin is separated from resin mold, or if pattern-transferred resin cannot be separated from resin mold, the combination of compositions is designated as "P" as shown in Tables 1 and 2. If damage or deficit is not found in either of the resin mold and the pattern-transferred resin when pattern-transferred resin is separated from resin mold, the combination of compositions is designated as "A" as shown in Tables 1 and 2.

Blends of the Shore hardness of resin molds and the Shore hardness of pattern-transferred resin observed. As shown in Tables 1 and 2, when the Shore hardness of a resin mold formed from the composition for formation of resin mold with the pattern ranges from 1 to 50 and the Shore hardness of a pattern-transferred resin ranges from 1 to 100, damage is not found for either the resin mold or the pattern-transferred resin when the pattern-transferred resin is separated from the resin mold.

If the pattern size is 200 as shown in Table 1, when the Shore hardness of a resin mold formed from the composition for formation of resin mold with the pattern ranges from 51 to 60 and the Shore hardness of a pattern-transferred resin ranges from 1 to 60, damage is not found for either the resin mold or the pattern-transferred resin when the pattern-transferred resin is separated from the resin mold.

If the pattern size is 200 as shown in Table 1, when the Shore hardness of a resin mold formed from the composition for formation of resin mold with the pattern ranges from 61 to 75 and the Shore hardness of a pattern-transferred resin ranges from 1 to 55, damage is not found for either the resin mold or the pattern-transferred resin when the pattern-transferred resin is separated from the resin mold.

If the pattern size is 200 as shown in Table 1, when the Shore hardness of a resin mold formed from the composition for formation of resin mold with the pattern ranges from 76 to 100 and the Shore hardness of a pattern-transferred resin ranges from 1 to 45, damage is not found for either the resin mold or the pattern-transferred resin when the pattern-transferred resin is separated from the resin mold.

If the pattern size is 600 μm as shown in Table 2, when the Shore hardness of a resin mold formed from the composition for formation of resin mold with the pattern ranges from 1 to 50 and the Shore hardness of a pattern-transferred resin ranges from 1 to 100, damage is not found for either the resin mold or the pattern-transferred resin when the pattern-transferred resin is separated from the resin mold.

If the pattern size is 600 μm, as shown in Table 2, if the Shore hardness of a resin mold formed from the composition for formation of resin mold with the pattern ranges from 51 to 60 and the Shore hardness of a pattern-transferred resin ranges from 1 to 50, then damage is not found for either the resin mold or the pattern-transferred resin when the pattern-transferred resin is separated from the resin mold.

If the pattern size is 600 μm, as shown in Table 2, if the Shore hardness of a resin mold formed from the composition for formation of resin mold with the pattern ranges from 61 to 75 and the Shore hardness of a pattern-transferred resin ranges from 1 to 45, then damage is not found for either the resin mold or the pattern-transferred resin when the pattern-transferred resin is separated from the resin mold.

If the pattern size is 600 μm, as shown in Table 2, if the Shore hardness of a resin mold formed from the composition for formation of resin mold with the pattern ranges from 76 to 100 and the Shore hardness of a pattern-transferred resin ranges from 1 to 40, then damage is not found for either the resin mold or the pattern-transferred resin when the pattern-transferred resin is separated from the resin mold.

TABLE 3

Compositions for formation of resin mold having a pattern with size of 200 μm and for formation of resin to which the pattern is transferred ("pattern-transferred resin") and Shore hardness, reaction percentages of resin mold and pattern-transferred resin

| | | Entry 36 | Entry 37 | Entry 38 | Entry 39 | Entry 40 | Entry 41 | Entry 42 | Entry 43 | Entry 44 | Entry 45 |
|---|---|---|---|---|---|---|---|---|---|---|---|
| Composition for formation of resin mold with a pattern | Constituent A | 49.75% | 49.75% | 20.7% | 20.7% | | | | | | |
| | Constituent B | 49.75% | 49.75% | 78.8% | 78.8% | 99.5% | 99.5% | 68.4% | 68.4% | 68.4% | 68.4% |
| | Constituent C | | | | | | | | | | |
| | Constituent D | | | | | | | 31.1% | 31.1% | 31.1% | 31.1% |
| | Constituent E | 0.5% | 0.5% | 0.5% | 0.5% | 0.5% | 0.5% | 0.5% | 0.5% | 0.5% | 0.5% |
| Composition for formation of pattern-transferred resin | Constituent F | | | | | | | 62.0% | 62.0% | | |
| | Constituent G | | | | | | | | | | |
| | Constituent H | 49.9% | 49.9% | 37.8% | 37.8% | | | | | | |
| | Constituent I | 49.9% | 49.9% | | | | | | | | |
| | Constituent J | | | 62.0% | 62.0% | 89.8% | 89.8% | | | 98.8% | 98.8% |
| | Constituent K | | | | | 10.0% | 10.0% | | | | |
| | Constituent L | | | | | | | | | | |
| | Constituent M | | | | | | | 37.8% | 37.8% | | |
| | Constituent E | 0.2% | 0.2% | 0.2% | 0.2% | 0.2% | 0.2% | 0.2% | 0.2% | 0.2% | 0.2% |
| Exposure time of resin mold | | 1200 | 10 | 1200 | 10 | 1200 | 10 | 1200 | 10 | 1200 | 10 |
| Reaction percentage of resin mold | | 80% | 46% | 76% | 43% | 68% | 40% | 65% | 38% | 65% | 38% |
| Shore hardness of resin mold | | 48 | 12 | 58 | 15 | 65 | 22 | 78 | 40 | 78 | 40 |
| Exposure time of pattern-transferred resin | | 400 | 400 | 400 | 400 | 400 | 400 | 400 | 400 | 400 | 400 |
| Reaction percentage of pattern-transferred resin | | 63% | 63% | 70% | 70% | 78% | 78% | 82% | 82% | 75% | 75% |
| Shore hardness of pattern-transferred resin | | 78 | 78 | 70 | 70 | 56 | 56 | 41 | 41 | 48 | 48 |
| Pattern size | | 200 μm | 200 μm | 200 μm | 200 μm | 200 μm | 200 μm | 200 μm | 200 μm | 200 μm | 200 μm |
| Presence of damage of resin mold or pattern-transferred resin | | A | P | P | P | P | P | A | P | P | P |

As shown in Entries 37, 39, 41, 43 and 45, if the reaction percentages of resin molds are less than 50%, damages arise in resin molds or pattern-transferred resins.

As shown in Entries 38, 40 and 44, if the reaction percentages of resin molds are greater than 50%, presence of absence of damages in resin molds or pattern-transferred resins depends on blends of the Shore hardness of resin molds and pattern-transferred resin as explained above.

TABLE 4

Compositions for formation of resin mold having a pattern with size of 600 μm and for formation of resin to which the pattern is transferred ("pattern-transferred resin") and Shore hardness, reaction percentages of resin mold and pattern-transferred resin

|  |  | Entry 46 | Entry 47 | Entry 48 | Entry 49 | Entry 50 | Entry 51 | Entry 52 |
|---|---|---|---|---|---|---|---|---|
| Composition for formation of resin mold with a pattern | Constituent A | 49.75% | 49.75% | 20.7% | 20.7% | 20.7% | 20.7% |  |
|  | Constituent B | 49.75% | 49.75% | 78.8% | 78.8% | 78.8% | 78.8% | 87.1% |
|  | Constituent C |  |  |  |  |  |  | 12.4% |
|  | Constituent D |  |  |  |  |  |  |  |
|  | Constituent E | 0.5% | 0.5% | 0.5% | 0.5% | 0.5% | 0.5% | 0.5% |
| Composition for formation of pattern-transferred resin | Constituent F | 62.0% | 62.0% |  |  |  |  | 62.0% |
|  | Constituent G | 37.8% | 37.8% |  |  |  |  | 37.8% |
|  | Constituent H |  |  |  |  |  |  |  |
|  | Constituent I |  |  |  |  |  |  |  |
|  | Constituent J |  |  | 99.8% | 99.8% | 89.8% | 89.8% |  |
|  | Constituent K |  |  |  |  | 10.0% | 10.0% |  |
|  | Constituent L |  |  |  |  |  |  |  |
|  | Constituent M |  |  |  |  |  |  |  |
|  | Constituent E | 0.2% | 0.2% | 0.2% | 0.2% | 0.2% | 0.2% | 0.2% |
| Exposure time of resin mold |  | 1200 | 10 | 1200 | 10 | 1200 | 10 | 1200 |
| Reaction percentage of resin mold |  | 80% | 46% | 76% | 43% | 76% | 43% | 70% |
| Shore hardness of resin mold |  | 48 | 12 | 58 | 15 | 58 | 15 | 69 |
| Exposure time of pattern-transferred resin |  | 400 | 400 | 400 | 400 | 400 | 400 | 400 |
| Reaction percentage of pattern-transferred resin |  | 88% | 88% | 75% | 75% | 78% | 78% | 88% |
| Shore hardness of pattern-transferred resin |  | 11 | 11 | 48 | 48 | 56 | 56 | 11 |
| Pattern size |  | 600 μm | 600 μm | 600 μm | 600 μm | 600 μm | 600 μm | 600 μm |
| Presence of damage of resin mold or pattern-transferred resin |  | A | P | A | P | P | P | A |

|  |  | Entry 53 | Entry 54 | Entry 55 | Entry 56 | Entry 57 | Entry 58 | Entry 59 |
|---|---|---|---|---|---|---|---|---|
| Composition for Formation of resin mold with a pattern | Constituent A |  |  |  |  |  |  |  |
|  | Constituent B | 87.1% | 99.5% | 99.5% | 68.4% | 68.4% | 68.4% | 68.4% |
|  | Constituent C | 12.4% |  |  |  |  |  |  |
|  | Constituent D |  |  |  | 31.1% | 31.1% | 31.1% | 31.1% |
|  | Constituent E | 0.5% | 0.5% | 0.5% | 0.5% | 0.5% | 0.5% | 0.5% |
| Composition for Formation of pattern-transferred resin | Constituent F | 62.0% |  |  | 62.0% | 62.0% | 62.0% | 62.0% |
|  | Constituent G | 37.8% |  |  |  |  |  |  |
|  | Constituent H |  |  |  |  |  |  |  |
|  | Constituent I |  |  |  |  |  |  |  |
|  | Constituent J |  | 98.8% | 98.8% |  |  |  |  |
|  | Constituent K |  |  |  |  |  |  |  |
|  | Constituent L |  |  |  | 37.8% | 37.8% |  |  |
|  | Constituent M |  |  |  |  |  | 37.8% | 37.8% |
|  | Constituent E | 0.2% | 0.2% | 0.2% | 0.2% | 0.2% | 0.2% | 0.2% |
| Exposure time of resin mold |  | 10 | 1200 | 10 | 1200 | 10 | 1200 | 10 |
| Reaction percentage of resin mold |  | 45% | 68% | 40% | 65% | 38% | 65% | 38% |
| Shore hardness of resin mold |  | 25 | 65 | 22 | 78 | 40 | 78 | 40 |
| Exposure time of pattern-transferred resin |  | 400 | 400 | 400 | 400 | 400 | 400 | 400 |
| Reaction percentage of pattern-transferred resin |  | 88% | 75% | 75% | 82% | 82% | 82% | 82% |
| Shore hardness of pattern-transferred resin |  | 11 | 48 | 48 | 35 | 35 | 41 | 41 |
| Pattern size |  | 600 μm | 600 μm | 600 μm | 600 μm | 600 μm | 600 μm | 600 μm |
| Presence of damage of resin mold or pattern-transferred resin |  | P | P | P | A | P | P | P |

As shown in Entries 47, 49, 51, 53 and 55, 57 and 59, if the reaction percentages of resin molds are lower than 50%, damages arise in resin molds or pattern-transferred resins.

As shown in Entries 50, 54 and 58, if the reaction percentages of resin molds are higher than 50%, presence of absence of damages in resin molds or pattern-transferred resins depends on blends of the Shore hardness of resin molds and pattern-transferred resin as explained above.

As shown in Entries 61, 63, 65, 67, 69, 71, 73, 75, 77, 79 and 81, if the reaction percentages of pattern-transferred resins are lower than 50%, damages arise in resin molds or pattern-transferred resins.

As shown in Entries 68, 74 and 80, if the reaction percentages of pattern-transferred resins are higher than 50%, presence of absence of damages in resin molds or pattern-transferred resins depends on blends of the Shore hardness of resin molds and pattern-transferred resin as explained above.

TABLE 5

Compositions for formation of resin mold having a pattern with size of 600 μm and for formation of resin to which the pattern is transferred ("pattern-transferred resin") and Shore hardness, reaction percentages of resin mold and pattern-transferred resin

|  |  | Entry 60 | Entry 61 | Entry 62 | Entry 63 | Entry 64 | Entry 65 | Entry 66 | Entry 67 | Entry 68 | Entry 69 | Entry 70 |
|---|---|---|---|---|---|---|---|---|---|---|---|---|
| Composition for formation of resin mold with a pattern | Constituent A | 99.5% | 99.5% | 49.75% | 49.75% | 20.7% | 20.7% | 20.7% | 20.7% | 20.7% | 20.7% |  |
|  | Constituent B |  |  | 49.75% | 49.75% | 78.8% | 78.8% | 78.8% | 78.8% | 78.8% | 78.8% | 99.5% |
|  | Constituent C |  |  |  |  |  |  |  |  |  |  |  |
|  | Constituent D |  |  |  |  |  |  |  |  |  |  |  |
|  | Constituent E | 0.5% | 0.5% | 0.5% | 0.5% | 0.5% | 0.5% | 0.5% | 0.5% | 0.5% | 0.5% | 0.5% |
| Composition for formation of pattern-transferred resin | Constituent F | 62.0% | 62.0% |  |  | 62.0% | 62.0% |  |  |  |  | 62.0% |
|  | Constituent G | 37.8% | 37.8% |  |  | 37.8% | 37.8% |  |  |  |  | 37.8% |
|  | Constituent H |  |  | 49.9% | 49.9% |  |  |  |  | 37.8% | 37.8% |  |
|  | Constituent I |  |  | 49.9% | 49.9% |  |  |  |  |  |  |  |
|  | Constituent J |  |  |  |  |  |  | 89.8% | 89.8% | 62.0% | 62.0% |  |
|  | Constituent K |  |  |  |  |  |  | 10.0% | 10.0% |  |  |  |
|  | Constituent L |  |  |  |  |  |  |  |  |  |  |  |
|  | Constituent M |  |  |  |  |  |  |  |  |  |  |  |
|  | Constituent E | 0.2% | 0.2% | 0.2% | 0.2% | 0.2% | 0.2% | 0.2% | 0.2% | 0.2% | 0.2% | 0.2% |
| Exposure time of resin mold |  | 1200 | 1200 | 1200 | 1200 | 1200 | 1200 | 1200 | 1200 | 1200 | 1200 | 1200 |
| Reaction percentage of resin mold |  | 85% | 85% | 80% | 80% | 76% | 76% | 76% | 76% | 76% | 76% | 68% |
| Shore hardness of resin mold |  | 28 | 28 | 48 | 48 | 58 | 58 | 58 | 58 | 58 | 58 | 65 |
| Exposure time of pattern-transferred resin |  | 400 | 10 | 400 | 10 | 400 | 10 | 400 | 10 | 400 | 10 | 400 |
| Reaction percentage of pattern-transferred resin |  | 88% | 45% | 63% | 42% | 88% | 45% | 78% | 46% | 70% | 45% | 88% |
| Shore hardness of pattern-transferred resin |  | 11 | 5 | 78 | 51 | 11 | 5 | 56 | 25 | 70 | 40 | 11 |
| Pattern size |  | 200 μm | 200 μm | 200 μm | 200 μm | 200 μm | 200 μm | 200 μm | 200 μm | 200 μm | 200 μm | 200 μm |
| Presence of damage of resin mold or pattern-transferred resin |  | A | P | A | P | A | P | A | P | P | P | A |

|  |  | Entry 71 | Entry 72 | Entry 73 | Entry 74 | Entry 75 | Entry 76 | Entry 77 | Entry 78 | Entry 79 | Entry 80 | Entry 81 |
|---|---|---|---|---|---|---|---|---|---|---|---|---|
| Composition for formation of resin mold with a pattern | Constituent A |  |  |  |  |  |  |  |  |  |  |  |
|  | Constituent B | 99.5% | 99.5% | 99.5% | 99.5% | 99.5% | 68.4% | 68.4% | 68.4% | 68.4% | 68.4% | 68.4% |
|  | Constituent C |  |  |  |  |  |  |  |  |  |  |  |
|  | Constituent D |  |  |  |  |  | 31.1% | 31.1% | 31.1% | 31.1% | 31.1% | 31.1% |
|  | Constituent E | 0.5% | 0.5% | 0.5% | 0.5% | 0.5% | 0.5% | 0.5% | 0.5% | 0.5% | 0.5% | 0.5% |
| Composition for formation of pattern-transferred resin | Constituent F | 62.0% |  |  |  |  | 62.0% | 62.0% | 62.0% | 62.0% |  |  |
|  | Constituent G | 37.8% |  |  |  |  | 37.8% | 37.8% |  |  |  |  |
|  | Constituent H |  |  |  |  |  |  |  |  |  |  |  |
|  | Constituent I |  |  |  |  |  |  |  |  |  |  |  |
|  | Constituent J |  | 98.8% | 98.8% | 89.8% | 89.8% |  |  |  |  | 98.8% | 98.8% |
|  | Constituent K |  |  |  | 10.0% | 10.0% |  |  |  |  |  |  |
|  | Constituent L |  |  |  |  |  |  |  |  |  |  |  |
|  | Constituent M |  |  |  |  |  |  |  | 37.8% | 37.8% |  |  |
|  | Constituent E | 0.2% | 0.2% | 0.2% | 0.2% | 0.2% | 0.2% | 0.2% | 0.2% | 0.2% | 0.2% | 0.2% |
| Exposure time of resin mold |  | 1200 | 1200 | 1200 | 1200 | 1200 | 1200 | 1200 | 1200 | 1200 | 1200 | 1200 |
| Reaction percentage of resin mold |  | 68% | 68% | 68% | 68% | 68% | 65% | 65% | 65% | 65% | 65% | 65% |
| Shore hardness of resin mold |  | 65 | 65 | 65 | 65 | 65 | 78 | 78 | 78 | 78 | 78 | 78 |
| Exposure time of pattern-transferred resin |  | 10 | 400 | 10 | 400 | 10 | 400 | 10 | 400 | 10 | 400 | 10 |
| Reaction percentage of pattern-transferred resin |  | 45% | 75% | 38% | 78% | 46% | 88% | 45% | 82% | 42% | 75% | 38% |
| Shore hardness of pattern-transferred resin |  | 5 | 48 | 20 | 56 | 25 | 11 | 5 | 41 | 22 | 48 | 20 |
| Pattern size |  | 200 μm | 200 μm | 200 μm | 200 μm | 200 μm | 200 μm | 200 μm | 200 μm | 200 μm | 200 μm | 200 μm |
| Presence of damage of resin mold or pattern-transferred resin |  | P | A | P | P | P | A | P | A | P | P | P |

TABLE 6

Compositions for formation of resin mold having a pattern with size of 600 μm and for formation of resin to which the pattern is transferred ("pattern-transferred resin") and Shore hardness, reaction percentages of resin mold and pattern-transferred resin

|  |  | Entry 82 | Entry 83 | Entry 84 | Entry 85 | Entry 86 | Entry 87 | Entry 88 | Entry 89 | Entry 90 |
|---|---|---|---|---|---|---|---|---|---|---|
| Composition for formation of resin mold with a pattern | Constituent A | 99.5% | 99.5% | 99.5% | 99.5% | 49.75% | 49.75% | 20.7% | 20.7% | 20.7% |
|  | Constituent B |  |  |  |  | 49.75% | 49.75% | 78.8% | 78.8% | 78.8% |
|  | Constituent C |  |  |  |  |  |  |  |  |  |
|  | Constituent D |  |  |  |  |  |  | 0.5% | 0.5% | 0.5% |
|  | Constituent E | 0.5% | 0.5% | 0.5% | 0.5% | 0.5% | 0.5% | 0.5% | 0.5% | 0.5% |
| Composition for formation of pattern-transferred resin | Constituent F | 62.0% | 62.0% |  |  | 62.0% | 62.0% |  |  |  |
|  | Constituent G | 37.8% | 37.8% |  |  | 37.8% | 37.8% |  |  |  |
|  | Constituent H |  |  | 49.9% | 49.9% |  |  |  |  |  |
|  | Constituent I |  |  | 49.9% | 49.9% |  |  |  |  |  |
|  | Constituent J |  |  |  |  |  |  | 89.8% | 89.8% | 99.8% |
|  | Constituent K |  |  |  |  |  |  | 10.0% | 10.0% |  |
|  | Constituent L |  |  |  |  |  |  |  |  |  |
|  | Constituent M |  |  |  |  |  |  |  |  |  |
|  | Constituent E | 0.2% | 0.2% | 0.2% | 0.2% | 0.2% | 0.2% | 0.2% | 0.2% | 0.2% |
| Exposure time of resin mold |  | 1200 | 1200 | 1200 | 1200 | 1200 | 1200 | 1200 | 1200 | 1200 |
| Reaction percentage of resin mold |  | 85% | 85% | 85% | 85% | 80% | 80% | 76% | 76% | 76% |
| Shore hardness of resin mold |  | 28 | 28 | 28 | 28 | 48 | 48 | 58 | 58 | 58 |
| Exposure time of pattern-transferred resin |  | 400 | 10 | 400 | 10 | 400 | 10 | 400 | 10 | 400 |
| Reaction percentage of pattern-transferred resin |  | 88% | 45% | 63% | 42% | 88% | 45% | 78% | 45% | 75% |
| Shore hardness of pattern-transferred resin |  | 11 | 5 | 78 | 51 | 11 | 5 | 56 | 25 | 48 |
| Pattern size |  | 600 μm | 600 μm | 600 μm | 600 μm | 600 μm | 600 μm | 600 μm | 600 μm | 600 μm |
| Presence of damage of resin mold or pattern-transferred resin |  | A | P | A | P | A | P | P | P | A |

|  |  | Entry 91 | Entry 92 | Entry 93 | Entry 94 | Entry 95 | Entry 96 | Entry 97 | Entry 98 | Entry 99 |
|---|---|---|---|---|---|---|---|---|---|---|
| Composition for formation of resin mold with a pattern | Constituent A | 20.7% |  |  |  |  |  |  |  |  |
|  | Constituent B | 78.8% | 99.5% | 99.5% | 99.5% | 99.5% | 68.4% | 68.4% | 68.4% | 68.4% |
|  | Constituent C |  |  |  |  |  |  |  |  |  |
|  | Constituent D | 0.5% |  |  |  |  | 31.1% | 31.1% | 31.1% | 31.1% |
|  | Constituent E | 0.5% | 0.5% | 0.5% | 0.5% | 0.5% | 0.5% | 0.5% | 0.5% | 0.5% |
| Composition for formation of pattern-transferred resin | Constituent F |  |  | 62.0% | 62.0% |  | 62.0% | 62.0% | 62.0% | 62.0% |
|  | Constituent G |  |  |  |  |  |  |  |  |  |
|  | Constituent H |  |  |  |  |  |  |  |  |  |
|  | Constituent I |  |  |  |  |  |  |  |  |  |
|  | Constituent J | 99.8% |  |  |  | 98.8% | 98.8% |  |  |  |
|  | Constituent K |  |  |  |  |  |  |  |  |  |
|  | Constituent L |  |  |  |  |  | 37.8% | 37.8% |  |  |
|  | Constituent M |  | 37.8% | 37.8% |  |  |  |  | 37.8% | 37.8% |
|  | Constituent E | 0.2% | 0.2% | 0.2% | 0.2% | 0.2% | 0.2% | 0.2% | 0.2% | 0.2% |
| Exposure time of resin mold |  | 1200 | 1200 | 1200 | 1200 | 1200 | 1200 | 1200 | 1200 | 1200 |
| Reaction percentage of resin mold |  | 76% | 68% | 68% | 68% | 68% | 65% | 65% | 65% | 65% |
| Shore hardness of resin mold |  | 58 | 65 | 65 | 65 | 65 | 78 | 78 | 78 | 78 |
| Exposure time of pattern-transferred resin |  | 10 | 400 | 10 | 400 | 10 | 400 | 10 | 400 | 10 |
| Reaction percentage of pattern-transferred resin |  | 38% | 82% | 42% | 75% | 38% | 82% | 43% | 82% | 42% |
| Shore hardness of pattern-transferred resin |  | 20 | 41 | 22 | 48 | 20 | 35 | 18 | 41 | 22 |
| Pattern size |  | 600 μm | 600 μm | 600 μm | 600 μm | 600 μm | 600 μm | 600 μm | 600 μm | 600 μm |
| Presence of damage of resin mold or pattern-transferred resin |  | P | A | P | P | P | A | P | P | P |

As shown in Entries 83, 85, 87, 89, 91, 93, 95, 97 and 99, if the reaction percentages of patter-transferred resin are lower than 50%, damages arise in resin molds or pattern-transferred resins.

As shown in Entries 88, 94 and 98, if the reaction percentages of pattern-transferred resin are higher than 50%, presence of absence of damages in resin molds or pattern-transferred resins depends on blends of the Shore hardness of resin molds and pattern-transferred resin as explained above.

TABLE 7

Compositions for formation of resin mold with patterns with sizes of 1 μm and 50 μm and formation of resin to which the pattern is transferred ("pattern-transferred resin") and Shore hardness

|  |  | Entry 100 | Entry 101 | Entry 102 |
|---|---|---|---|---|
| Composition for formation of resin mold with a pattern | Constituent A |  |  |  |
|  | Constituent B | 68.4% | 68.4% | 68.4% |
|  | Constituent C |  |  |  |
|  | Constituent D | 31.1% | 31.1% | 31.1% |
|  | Constituent E | 0.5% | 0.5% | 0.5% |

TABLE 7-continued

Compositions for formation of resin mold with patterns
with sizes of 1 μm and 50 μm and formation of resin
to which the pattern is transferred ("pattern-transferred
resin") and Shore hardness

| | | Entry 100 | Entry 101 | Entry 102 |
|---|---|---|---|---|
| Composition for formation of pattern-transferred resin | Constituent F | | 62.0% | |
| | Constituent G | | 37.8% | |
| | Constituent H | 49.9% | | 49.9% |
| | Constituent I | 49.9% | | 49.9% |
| | Constituent J | | | |
| | Constituent K | | | |
| | Constituent L | | | |
| | Constituent M | | | |
| | Constituent E | 0.2% | 0.2% | 0.2% |
| Exposure time of resin mold | | 1200 | 1200 | 1200 |
| Reaction percentage of resin mold | | 65% | 65% | 65% |
| Shore hardness of resin mold | | 78 | 78 | 78 |
| Exposure time of pattern-transferred resin | | 400 | 400 | 400 |
| Reaction percentage of pattern-transferred resin | | 63% | 88% | 63% |
| Shore hardness of pattern-transferred resin | | 78 | 11 | 78 |
| Pattern size | | 1 μm | 50 μm | 50 μm |
| Presence of damage of resin mold or pattern-transferred resin | | A | A | P |

Such blend of the Shore hardness is not observed for a fine pattern such as a 1 μm pattern as shown in Entry 100 while such blend of the Shore hardness is observed for pattern of which size is greater than or equal to 50 μm as shown in Entries 101 and 102.

Presence or Absence of Damage Resins for Pattern Dimension of 200 μm

A Ni mold subjected to a treatment for improvement of mold releasablity with the treatment agent containing fluorine compound (DURASURF HD-2101Z, Daikin Industries, Ltd.) is prepared. The thickness and area of the Ni mold are 0.1 mm and 50 mm², respectively. The Ni mold has a surface on which a pattern is formed by recesses and convex portions. The width and depth of each of the recess portions are 200 μm together while the width of each of the convex portions is 400 μm. A composition for formation of resin mold is deposited on the patterned surface of the Ni mold. Further a non-alkali glass of which thickness and area are 1.1 mm and 100 mm², respectively, is disposed on the coating film of the composition such that the thickness of the coating film becomes approximately 1 mm. The coating film is irradiated under nitrogen atmosphere with a light from UV-LED lamp of which wavelength and intensity are 365 nm and 50 mW/cm², respectively, for 1200 seconds or 10 seconds.

The resin mold formed by the light irradiation is separated from the Ni mold. A composition for formation of resin that the pattern is transferred from the resin mold is deposited on the surface of the resin mold with the pattern transferred from the Ni mold. Further a non-alkali glass of which thickness and area are 1.1 mm and 100 mm², respectively, is disposed on the coating film of the composition such that the thickness of the coating film becomes approximately 1 mm. The coating film is irradiated under nitrogen atmosphere with a light from a UV-LED lamp of which wavelength and intensity are 365 nm and 20 mW/cm², for 400 seconds or 10 seconds, in a state in which the coating film contacts the patterned surface of the resin mold. The patterned resin formed by the light irradiation is separated from the resin mold.

The presence or absence of damage of the patterned resin separated from the resin mold and the resin mold is checked by a confocal laser microscope (OLS3100, Olympus). If damage is found for either of the patterned resin separated from the resin mold or the resin mold, or if separation of the patterned resin from the resin mold is impossible, the combination of compositions is designated as "P" as shown in Tables. If damage is not found in either of the resins, the combination of compositions is designated as "A" as shown in Tables.

Presence or Absence of Damage Resins for Pattern Dimension of 600 μm

A Ni mold subjected to a treatment for improvement of mold releasability with the treatment agent containing fluorine compound (DURASURF HD-2101Z, Daikin Industries, Ltd.) is prepared. The thickness and area of the Ni mold are 0.2 mm and 50 mm², respectively. The Ni mold has a surface on which a pattern formed by recess and convex portions. The width and depth of each of the recess portions are 600 μm together while the width of each of the convex portions is 900 μm. A composition for formation of resin mold is deposited on the patterned surface of the Ni mold. Further a non-alkali glass of which thickness and area are 1.1 mm and 100 mm², respectively, is disposed on the coating film of the composition such that the thickness of the coating film becomes approximately 1 mm. The coating film is irradiated under nitrogen atmosphere with a light from UV-LED lamp of which wavelength and intensity are 365 nm and 50 mW/cm², respectively, for 1200 seconds or 10 seconds. The resin mold formed by the light irradiation is separated from the Ni mold.

A composition for formation of resin to be separated from the resin mold is deposited on the surface of the resin mold with the pattern transferred from the Ni mold. Further a non-alkali glass of which thickness and area are 1.1 mm and 100 mm², respectively, is disposed on the coating film of the composition such that the thickness of the coating film becomes approximately 1 mm. The coating film is irradiated under nitrogen atmosphere with a light from UV-LED lamp of which wavelength and intensity are 365 nm and 20 mW/cm², respectively, for 400 seconds or 10 seconds, in a state in which the coating film contacts the patterned surface of the resin mold. The patterned resin formed by the light irradiation is separated from the resin mold.

The presence or absence of damage of the patterned resin separated from the resin mold and the resin mold is checked by a confocal laser microscope (OLS3100, Olympus). If damage is found for either of the patterned resin separated from the resin mold and the resin mold, or if separation of the patterned resin from the resin mold is impossible, the combination of compositions is designated as "P" as shown in Tables. If damage not found in either of the resins after separation from the resin mold, the combination of compositions is designated as "A" as shown in Tables.

Measurement of Shore Hardness

A non-alkali glass subjected to a treatment for improvement of mold releasability with the treatment agent containing a fluorocompound (OPTOOL HD-1101Z, Daikin Industries, Ltd) is prepared. The thickness and area of the non-alkali glass are 1.1 mm and 100 mm², respectively. A composition for formation of resin mold is deposited on the non-alkali glass. Further a non-alkali glass of which thickness and area are 1.1 mm and 100 mm², respectively, is disposed on the coating film of the composition such that the thickness of the coating film becomes approximately 1 mm. The coating film is irradiated under nitrogen atmosphere with a light from UV-LED lamp of which wavelength and intensity are 365 nm and 50 mW/cm², respectively, for 1200 seconds. The resin mold formed by the light irradiation is separated from the non-alkali glass. Six resin molds obtained by the above operation are stacked and Shore hardness is measured by a material hardness durometer Type D (GS-720G, TECLOCH).

A non-alkali glass subjected to a treatment for improvement of mold releasability with the treatment agent containing a fluorocompound (OPTOOL HD-1101Z, Daikin Industries, Ltd) is prepared. The thickness and area of the non-alkali glass are 1.1 mm and 100 mm², respectively. A composition for formation of resin to which a pattern of the resin mold is transferred from the resin mold is deposited on the non-alkali glass. Further a non-alkali glass of which thickness and area are 1.1 mm and 100 mm², respectively, is disposed on the coating film of the composition such that the thickness of the coating film becomes approximately 3 mm. The coating film is irradiated under nitrogen atmosphere with a light from UV-LED lamp of which wavelength and intensity are 365 nm and 20 mW/cm², respectively, for 400 seconds. The resin formed by the light irradiation is separated from the non-alkali glass. Two resins obtained by the above operation are stacked and Shore hardness is measured by a material hardness durometer Type D (GS-720G, TECLOCH).

Presence or Absence of Damage Resins for Pattern Dimension of 1 µm

A Ni mold has been subjected to a treatment for improvement of mold releasability with the treatment agent containing fluorine compound (DURASURF HD-2101Z, Daikin Industries, Ltd.) is prepared. The thickness and area of the Ni mold are 1 mm and 50 mm², respectively. The Ni mold has a surface on which a pattern formed by recess and convex portions. The width and depth of each of the recess portions are 1 µm together while the width of each of the convex portion is 2 µm. A composition for formation of resin mold is deposited on the patterned surface of the Ni mold. Further a non-alkali glass of which thickness and area are 1.1 mm and 100 mm², respectively, is disposed on the coating film of the composition such that the thickness of the coating film becomes approximately 1 mm. The coating film is irradiated under nitrogen atmosphere with a light from UV-LED lamp of which wavelength and intensity are 365 nm and 50 mW/cm², respectively, for 1200 seconds. The resin mold formed by the light irradiation is separated from the Ni mold.

A composition for formation of resin to which the pattern of the resin mold is transferred from the resin mold is deposited on the surface of the resin mold with the pattern transferred from the Ni mold. Further a non-alkali glass of which thickness and area are 1.1 mm and 100 mm², respectively, is disposed on the coating film of the composition such that the thickness of the coating film becomes approximately 1 mm. The coating film is irradiated under nitrogen atmosphere with a light from a UV-LED lamp of which the wavelength and intensity are 365 nm and 20 mW/cm², respectively, for 400 seconds, in a state in which the coating film contacts the patterned surface of the resin mold. The resin formed by the light irradiation is separated from the resin mold.

The presence or absence of damage of the resin separated from the resin mold and the resin mold is checked by a confocal laser microscope (OLS3100, Olympus). If damage is found for either of the patterned resin separated from the resin mold and the resin mold, or if separation of the patterned resin from the resin mold is impossible, the combination of compositions is designated as "P" as shown in Table 7. If damage not found in either of the resins after separation from the resin mold, the combination of compositions is designated as "A" as shown in Table 7.

Presence or Absence of Damage Resins for Pattern Dimension of 50 µm

A Ni mold has been subjected to a treatment for improvement of mold releasability with the treatment agent containing fluorine compound (DURASURF HD-2101Z, Daikin Industries, Ltd.) is prepared. The thickness and area of the Ni mold are 1 mm and 50 mm², respectively. The Ni mold has a surface on which a pattern formed by recess and convex portions. The width and depth of each of the recess portions are 50 µm together while the width of each of the convex portion is 100 µm. A composition for formation of resin mold is deposited on the patterned surface of the Ni mold. Further a non-alkali glass of which thickness and area are 1.1 mm and 100 mm², respectively, is disposed on the coating film of the composition such that the thickness of the coating film becomes approximately 1 mm. The coating film is irradiated under nitrogen atmosphere with a light from a UV-LED lamp of which wavelength and intensity are 365 nm and 50 mW/cm², respectively, for 1200 seconds. The resin mold formed by the light irradiation is separated from the Ni mold.

A composition for formation of resin to which the pattern of the resin mold is transferred from the resin mold is deposited on the surface of the resin mold with the pattern transferred from the Ni mold. Further a non-alkali glass of which thickness and area are 1.1 mm and 100 mm², respectively, is disposed on the coating film of the composition such that the thickness of the coating film becomes approximately 1 mm. The coating film is irradiated under nitrogen atmosphere with a light from a UV-LED lamp of which wavelength and intensity are 365 nm and 20 mW/cm², respectively, for 400 seconds, in a state in which the coating film contacts the patterned surface of the resin mold. The patterned resin formed by the light irradiation is separated from the resin mold.

The presence or absence of damage of the resin separated from the resin mold and the resin mold is checked by a confocal laser microscope (OLS3100, Olympus).

If damage is found for either of the patterned resin separated from the resin mold and the resin mold, or if separation of the patterned resin from the resin mold is impossible, the combination of compositions is designated as "P" as shown in Table 7. If damage not found in either of the resins after separation from the resin mold, the combination of compositions is designated as "A" as shown in Table 7.

Estimation of Percentage of Reaction for Resin Mold and Patterned Resin

A peak at 810 cm$^{-1}$, which is assigned to C=CH bending vibration observed by FT-IR spectroscopy is noted. The reaction percentage for the resin mold is estimated by calculation of decrease ratio of the intensity of the peak at 810 cm$^{-1}$ by the light irradiation of a coating film of a composition for a resin mold or resin to which a pattern of the resin mold is transferred from the resin mold on the bases of the intensity of a peak at 1,700 cm$^{-1}$, which is assigned to C=O stretching and remains unchanged even by photoirradiation of the coating film. Concretely, the reaction rate is calculated by the following equation:

$$\text{Percentage of Reaction (\%)} = (1 - (A1_{UV}/A2_{UV})/(A1_0/A2_0)) \times 100$$

wherein: $A1_0$, $A2_0$, $A1_{UV}$ and $A2_{UV}$ are an area of the peak at C=O stretching of the coating film, an area of the peak at C=CH bending vibration of the coating film, an area of the peak at C=O stretching of the resin mold and an area of the peak at C=CH bending vibration of the resin mold.

Reaction percentage for the separated mold is estimated in manner similar to the above method.

FT-IR Spectroscopy Measurement of Resin Mold

A non-alkali glass subjected to a treatment for improving mold releasability with a treatment agent containing a fluorocompound (OPTOOL HD-1101Z, Daikin Industries, Ltd) is prepared. The thickness and area of the non-alkali glass are 1.1 mm and 100 mm², respectively. A composition for formation of resin mold is deposited on the non-alkali glass. Further a non-alkali glass of which thickness and area are 1.1 mm and 100 mm², respectively, is disposed on the coating film of the composition such that the thickness of the coating film becomes approximately 1 mm. The coating film is irradiated under nitrogen atmosphere with a light from UV-LED lamp of which wavelength and intensity are 365 nm and 50 mW/cm², respectively, for 10 seconds. The resin mold formed by the light irradiation is separated from the non-alkali glass. FT-IR measurement of the resin mold is used by attenuated total reflection (ATR) method.

FT-IR Spectroscopy Measurement of Patterned Resin

A non-alkali glass subjected to a treatment for improving mold releasability with a treatment agent containing a fluorocompound (OPTOOL HD-1101Z, Daikin Industries, Ltd) is prepared. The thickness and area of the non-alkali glass are 1.1 mm and 100 mm², respectively. A composition for formation of resin to which a pattern of the resin mold is transferred from the resin mold is deposited on the non-alkali glass. Further a non-alkali glass of which thickness and area are 1.1 mm and 100 mm², respectively, is disposed on the coating film of the composition such that the thickness of the coating film becomes approximately 3 mm. The coating film is irradiated under nitrogen atmosphere with a light from UV-LED lamp of which wavelength and intensity are 365 nm and 20 mW/cm², respectively, for 10 seconds. The resin formed by the light irradiation is separated from the non-alkali glass. FT-IR measurement of the resin is used by attenuated total reflection (ATR) method.

What is claimed is:

1. A method of manufacturing a component, the method comprising:
    providing a first composition containing a photoinitiator;
    providing a resin mold with a pattern;
    curing the first composition to form a film to which a pattern is transferred from the resin mold having the pattern; and
    separating the film from the resin mold, wherein:
        when the resin mold's Shore hardness D is from 1 to 50, the film's Shore hardness is between 1 and 100, or
        when the resin mold's Shore hardness D is from 51 to 60, the film's Shore hardness is between 1 and 60; and
    the first composition contains at least one compound A represented by chemical formula (1) and a compound B represented by chemical formula (2),

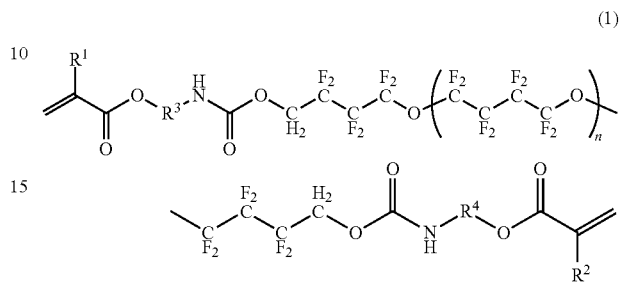

(1)

wherein, in formula (1),
each of $R^1$ and $R^2$ is a hydrogen atom or methyl group;
each of $R^3$ and $R^4$ represents a substituent including at least one atom selected from the group consisting of hydrogen atom, carbon atom, nitrogen atom, and sulfur atom; and
"n" denotes an integer from 1 to 10,

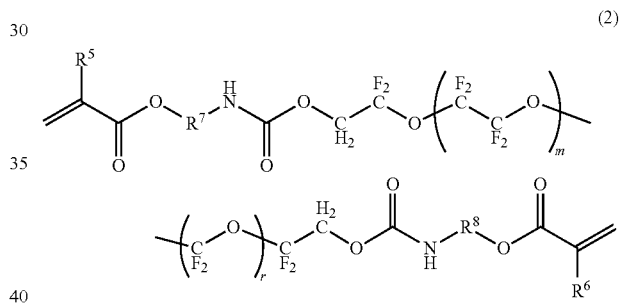

(2)

wherein, in formula (2),
each of $R^5$ and $R^6$ is a hydrogen atom or methyl group;
each of $R^7$ and $R^8$ represents a substituent including at least one atom selected from the group consisting of hydrogen atom, carbon atom, nitrogen atom, and sulfur atom; and
each of "m" and "r" denotes an integer from 1 to 30.

2. The method according to claim 1 wherein the pattern's size is greater than or equal to 50 µm.

3. The method according to claim 1 wherein the component is selected from the group consisting of a lens, a waveguide, and a diffuser.

* * * * *

UNITED STATES PATENT AND TRADEMARK OFFICE
CERTIFICATE OF CORRECTION

PATENT NO. : 10,213,943 B2
APPLICATION NO. : 15/262730
DATED : February 26, 2019
INVENTOR(S) : Taigo Akasaki, Risa Wada and Takeshi Osaki It is certified that error appears in the above-identified patent and that said Letters Patent is hereby corrected as shown below:

In the Specification

| | | |
|---|---|---|
| Column 6, | Line 12, | change "8, is any" to --8, $R^{11}$ is any-- |
| Column 6, | Line 17, | change "and is a" to --and $R^{11}$ is a-- |
| Column 6, | Line 18, | change "if is a" to --if $R^{11}$ is a-- |
| Column 6, | Line 23, | change "and may be" to --and $R^{11}$ may be-- |
| Column 15, | Line 7, | change "is 200 as" to --is 200 µm as-- |
| Column 15, | Line 14, | change "is 200 as" to --is 200 µm as-- |
| Column 15, | Line 21, | change "is 200 as" to --is 200 µm as-- |
| Column 15, | Line 64, | change "is 600 as" to --is 600 µm as-- |

In the Claims

Claim 1, Column 28, Line 4, change "the first composition contains at least one compound A" to --the resin mold is formed by curing a mold composition containing at least one compound A--

Signed and Sealed this
Seventeenth Day of September, 2019

Andrei Iancu
*Director of the United States Patent and Trademark Office*